Nov. 26, 1935.　　　G. A. LYON　　　2,022,121
TIRE COVER
Filed Jan. 2, 1932　　2 Sheets-Sheet 1

Inventor
George Albert Lyon.

Nov. 26, 1935.　　　G. A. LYON　　　2,022,121
TIRE COVER
Filed Jan. 2, 1932　　2 Sheets-Sheet 2
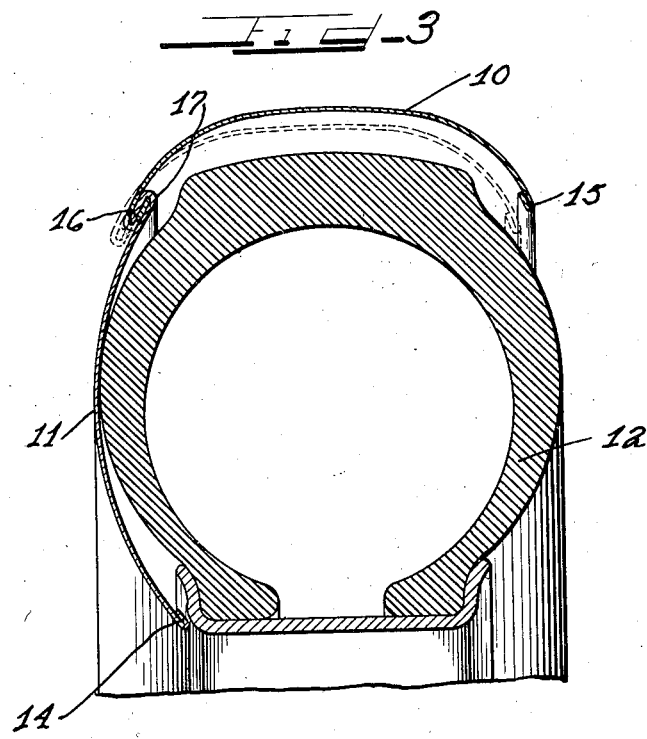
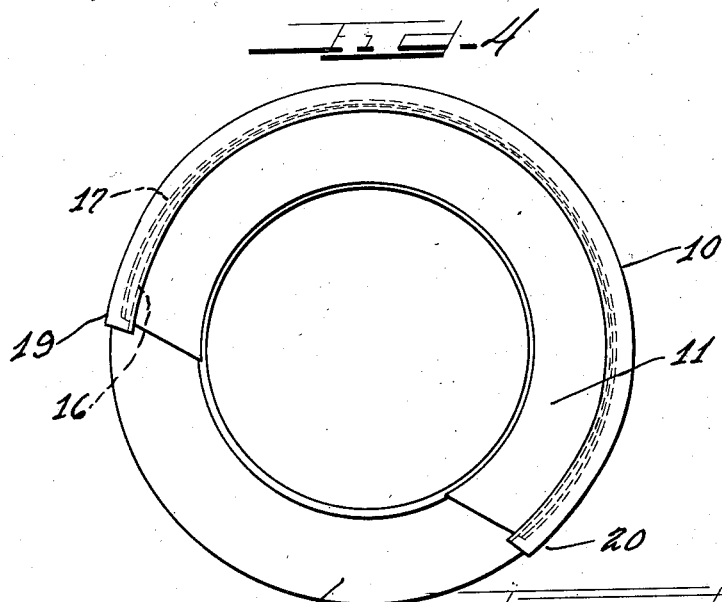
Inventor
George Albert Lyon.

Patented Nov. 26, 1935

2,022,121

UNITED STATES PATENT OFFICE 2,022,121

TIRE COVER

George Albert Lyon, Allenhurst, N. J., assignor to Lyon Incorporated, Asbury Park, N. J., a corporation of Delaware Application January 2, 1932, Serial No. 584,559

7 Claims. (Cl. 150—54)

This invention relates to a tire cover of much the same general construction as that disclosed in my U. S. Letters Patent No. 1,807,697 which issued June 2, 1931, and more particularly to a multi-part tire cover including a split rim and a side plate and provided with means for circumferentially interlocking them together on one side of the spare tire on which the cover is disposed.

An object of this invention is to provide an improved tire cover of the same general type as my patented tire cover in which there is included means for interlocking the two parts in such a way as to enable them to be held in tight cooperation when on the tire, and yet at the same time enable them to be separated for the purpose of removing the cover from the tire.

Another object of the invention relates to the interfitting of the adjacent edges of the rim and side parts of my patented tire cover so that when the edges are interfitted the parts are held in proper tire protecting position on the tire.

In accordance with the general features of this invention there is provided a multi-part tire cover including a split rim and an arcuate side part, both of which parts have their adjacent edges provided with turned edges which are adapted to be interfitted in the process of applying the parts to the tire so that when they are on the tire in proper interfitted relation, a protective tire cover is provided for the tire.

Another feature of the invention relates to the provision of a novel method of mounting the parts of a tire cover on a tire in such a way that the act of mounting one of the parts on the tire, namely, the rim part, results in its being interlocked to the other part, such for example as the side plate part.

Figure 1:
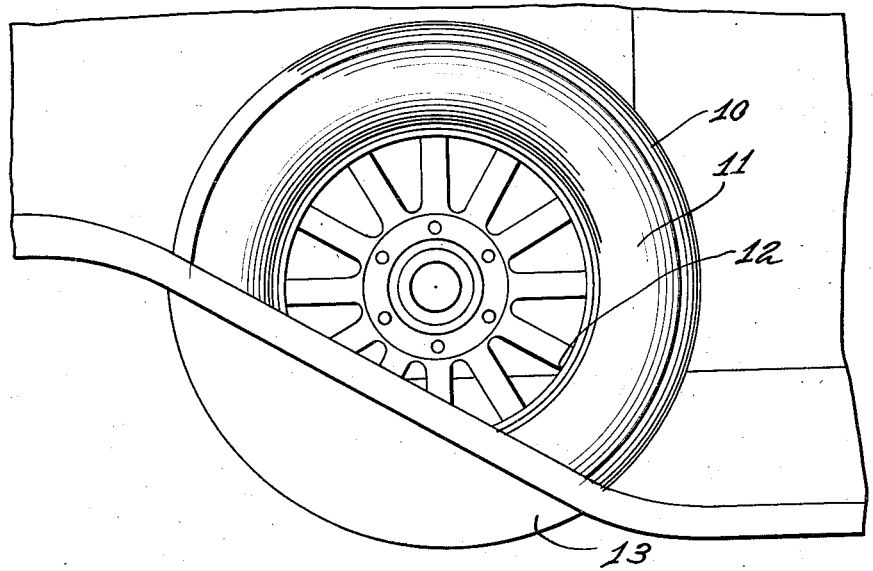
Figure 2:
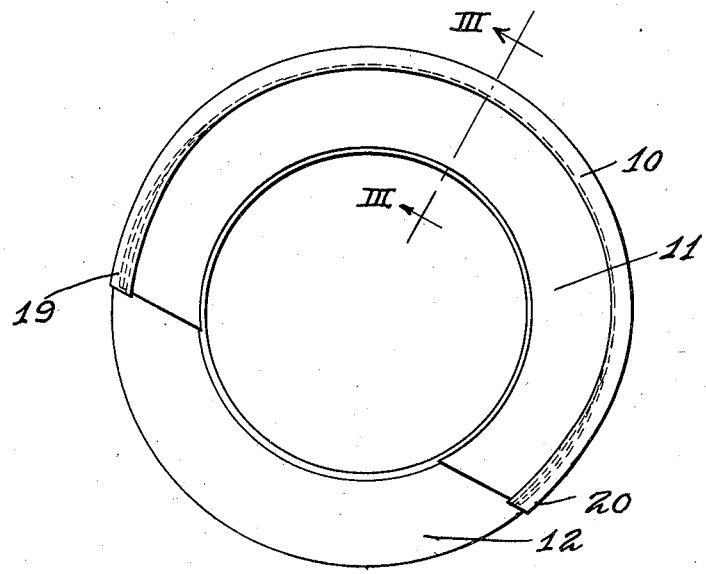

Other objects and features of this invention will more fully appear from the following detailed description taken in connection with the accompanying drawings which illustrate a single embodiment thereof and in which Figure 1 is a side view of a cover embodying the features of this invention illustrating it applied to a spare tire disposed in a conventional automobile fender well;

Figure 2 is another view of the tire cover showing it applied to a spare tire and showing the manner in which the free ends of the split rim of the cover are adapted to be moved together so that the split rim may be moved downwardly out of interlocked relation with the side plate part of the cover;

Figure 3 is an enlarged cross-sectional view taken through the tire cover of my invention showing it applied to the spare tire, and illustrating in dotted line the position to which the split rim is adapted to be depressed to disengage it from the side plate after the free ends of the split rim have been moved to the full line position shown in Figure 2; and Figure 4 is another view of the cover similar to Figure 2 but differing from Figure 2 in that the split rim has been moved downwardly relative to the side plate so as to disengage the interlocking marginal edges of these two parts whereby the two parts may be separately removed from the spare tire.

On the drawings:

The reference character 10 designates generally a split rim part of the cover and the reference character 11 designates generally an arcuate side plate part of the cover. These two parts are arranged to cooperate with each other in somewhat the same manner as the analogous parts of my patented cover are designed to cooperate with each other. They may be made of any suitable material other than fabric, such for example as sheet metal, and may be fabricated by any suitable apparatus.

These two parts together constitute the spare tire cover and are adapted to afford a protective covering for a spare tire and wheel 12 disposed in a conventional automobile fender well 13. Furthermore, it will be noted that the ends of these parts 10 and 11 terminate at the mouth of the fender well, or, in other words, do not extend clear around the tire. These parts, however, do extend around more than one-half the circumference of the tire or, in other words, around more than 180° of the tire.

Each of these two parts is transversely convex and their free ends comprise turned edges 14 and 15 as shown in Figure 3. Also, it will be noted that the turned edge 15 extends inwardly of the outermost periphery of the tire so that it is disposed at the rear side of the rear edge of the tread when the rim is in tire protective position so that this edge is enabled to aid in preventing lateral displacement of the cover relative to the tire.

The present invention has for the most part to do with the manner in which the adjacent edges of these two parts are brought into interlocked or interfitted relation for holding these parts in proper tire protective position on the spare tire.

Referring to Figure 3, it will be noted that each of these two parts 10 and 11 have their adjacent edges turned back upon themselves as indicated at 16 and 17 and that these two turned edges 16 and 17 are designed to be interfitted so as to interlock the two cover parts together when the tire cover is in proper tire protecting position.

Normally, when the tire cover is in proper tire protecting position on the spare tire the parts 10 and 11 are in the interlocked position illustrated in Figure 3. When it becomes necessary to remove the cover from the tire, the free ends of the split rim 10, which ends are designated by the reference numerals 19 and 20 in Figure 2, are pushed inwardly so as to disengage the interlocked marginal edges 16 and 17 at the lower extremities of the cover. Thereafter, the split rim 10 is bodily pushed downwardly to the dotted line position shown in Figure 3 so that the two turned edges 16 and 17 are completely disengaged from each other throughout their circumferential length.

It will of course be appreciated that when these inturned edges 16 and 17 are disengaged as shown by the dotted line position in Figure 3, the split rim may be expanded off the tread of the tire and both parts may then be removed from the tire.

In the application of the cover to the tire the reverse of the above described operation takes place. In other words, the side plate 11 is first placed on the outer side of the spare tire to be covered and the split rim is expanded over the tread of the tire so as to bring its marginal edge 16 into a position in close proximity to the marginal edge 17 of the side plate 11. The inherent resiliency of the split rim 10 acts to contract the split rim toward the tire.

Once the split rim and the side plate are disposed on the tire with their marginal edges in close proximity the split rim may be interlocked to the side plate by first depressing it to the dotted line position shown in Figure 3 by thereafter bringing its marginal inturned edge 16 into proper register with the marginal inturned edge 17 of the side plate so that upon an upward movement of the split rim the two edges are interlocked circumferentially of the tire.

From the above detailed description of my novel tire cover it will be noted that I have provided not only a novel tire cover but also a novel method of applying the same to the tire. In this tire cover the mere flexing of the split rim relative to the side plate part enables the interlocking of the two parts together or their disconnection as the case may be. Of course, it is to be appreciated that the specific details of the interlocking means may be varied in accordance with the particular shape and size of the tire cover desired, as well as in accordance with the type of interlocking fit desired.

The invention, however, is not to be limited to the specific details of the particular interlocking arrangement shown but only insofar as defined by the scope and spirit of the appended claims.

I claim as my invention:

1. In a tire cover, a split rim for disposition over the tread of the tire and having a rear edge terminating inwardly at the tire adjacent the tire tread, an arcuate side plate associated therewith for disposition over the outer side wall of the spare tire, and a lock seam interconnecting the associated edges of the rim and side plate to form a detachable interlocking connection between them whereby the rim may be interlocked or disengaged from the side plate by a flexing of the same away from or toward the tread of the tire.

2. In a multi-part tire cover including a side plate and a split rim disposed over the tire tread but leaving the rear side of the tire substantially uncovered, means for interlocking the adjacent edges of the plate and rim at a side of the tire tread and formed to enable the rim to be flexed into and out of interlocked engagement with the plate while on the spare tire whereby the portions may be connected or disconnected on the tire.

3. In a multi-part automobile spare tire cover including a split rim of shallow cross-sectional shape so as to be readily flexible and a side plate, means for interconnecting the adjacent edges of the plate and rim comprising interfitting turned edges on said plate and rim respectively with one edge formed to fit in an annular pocket defined by the other edge and so arranged as to be brought into or out of interlocking register with each other by a flexing of the split rim relative to the plate while the cover is on the tire.

4. In a tire cover, a split rim for disposition over the exposed portion of the tread of a spare tire, a plate cooperable therewith for disposition over an outer side wall of a tire, and means interconnecting the adjacent edges of said plate and rim for interlocking them, said interlocked connection being established by a movement of the edge of the rim radially outward into engagement with and under the associated edge of the plate.

5. In a tire cover, a split rim for disposition over the exposed portion of the tread of a spare tire, a plate cooperable therewith for disposition over an outer side wall of a tire, and means interconnecting the adjacent edges of said plate and rim for interlocking them, said interlocked connection being established by a relative movement of the portions while they are on said tire, said interlocked connection comprising circumferentially extending portions on the plate and rim respectively arranged to be slid into register by a movement of the rim portion radially outward to bring it under the adjacent plate portion.

6. In an automobile spare tire cover, a side part for disposition over a side wall of a tire, a rim for disposition over the tread of the tire and means on said rim movable into interlocking cooperation with a portion of said side part by the flexing of said rim after both the rim and side part are in place on the tire to interlock the rim and said side part.

7. In an automobile spare tire cover, a side part for disposition over a side wall of a tire, a rim for disposition over substantially only the tread of the tire, and means on an edge of said rim movable into interfitting engagement with an edge of said side part by the flexing of said rim after both the rim and said side part are in place on the tire to secure the side part to the rim.

GEORGE ALBERT LYON.